United States Patent
Emonds et al.

(10) Patent No.: US 12,458,928 B2
(45) Date of Patent: Nov. 4, 2025

(54) METHOD FOR PRODUCING A POLYELECTROLYTE COMPLEX MEMBRANE

(71) Applicant: DWI—LEIBNIZ-INSTITUT FUR INTERAKTIVE MATERIALIEN E.V., Aachen (DE)

(72) Inventors: Stephan Emonds, Aachen (DE); Johannes Kamp, Aachen (DE); Matthias Wessling, Aachen (DE)

(73) Assignee: DWI—LEIBNIZ-INSTITUT FUR INTERAKTIVE MATERIALIEN E.V. (DE)

( * ) Notice: Subject to any disclaimer, the term of this patent is extended or adjusted under 35 U.S.C. 154(b) by 433 days.

(21) Appl. No.: 17/926,393

(22) PCT Filed: Jun. 2, 2021

(86) PCT No.: PCT/EP2021/064794
§ 371 (c)(1),
(2) Date: Nov. 18, 2022

(87) PCT Pub. No.: WO2021/245137
PCT Pub. Date: Dec. 9, 2021

(65) Prior Publication Data
US 2023/0182083 A1  Jun. 15, 2023

(30) Foreign Application Priority Data
Jun. 5, 2020 (EP) .................. 20178633

(51) Int. Cl.
| B01D 67/00 | (2006.01) |
| B01D 69/02 | (2006.01) |
| B01D 69/04 | (2006.01) |
| B01D 69/06 | (2006.01) |
| B01D 69/08 | (2006.01) |
| B01D 69/12 | (2006.01) |
| B01D 71/28 | (2006.01) |
| B01D 71/60 | (2006.01) |
| B01D 71/62 | (2006.01) |
| B01D 71/82 | (2006.01) |

(52) U.S. Cl.
CPC .... B01D 67/00111 (2022.08); B01D 67/0016 (2013.01); B01D 67/00165 (2022.08);
(Continued)

(58) Field of Classification Search
CPC ........ B01D 69/02; B01D 69/08; B01D 69/12; B01D 69/125; B01D 69/1251;
(Continued)

(56) References Cited

U.S. PATENT DOCUMENTS 5,681,568 A * 10/1997 Goldin ................ A61K 9/0024
264/41
10,253,203 B2  4/2019 Schlenoff
(Continued)

FOREIGN PATENT DOCUMENTS

| CN | 101283043 A | 10/2008 |
| CN | 110804773 A | 2/2020 |
| WO | 2018208902 | 11/2018 |

OTHER PUBLICATIONS

Gherasim et al., ACS Appl. Mater. Interfaces 2016, 8, 19145-19157 (Year: 2016).*
(Continued)

Primary Examiner — Allison G Fitzsimmons
(74) Attorney, Agent, or Firm — McDonald Hopkins LLC

(57) ABSTRACT

The present invention relates to a method for producing a polyelectrolyte complex (PEC) membrane having a predetermined porosity via salt dilution induced phase separation, in which a liquid polymer solution (P) containing polyanions (A) and polycations (C) dissolved in an aqueous medium at an overcritical salt concentration is exposed to an aqueous medium.

15 Claims, 10 Drawing Sheets

Figure 1:
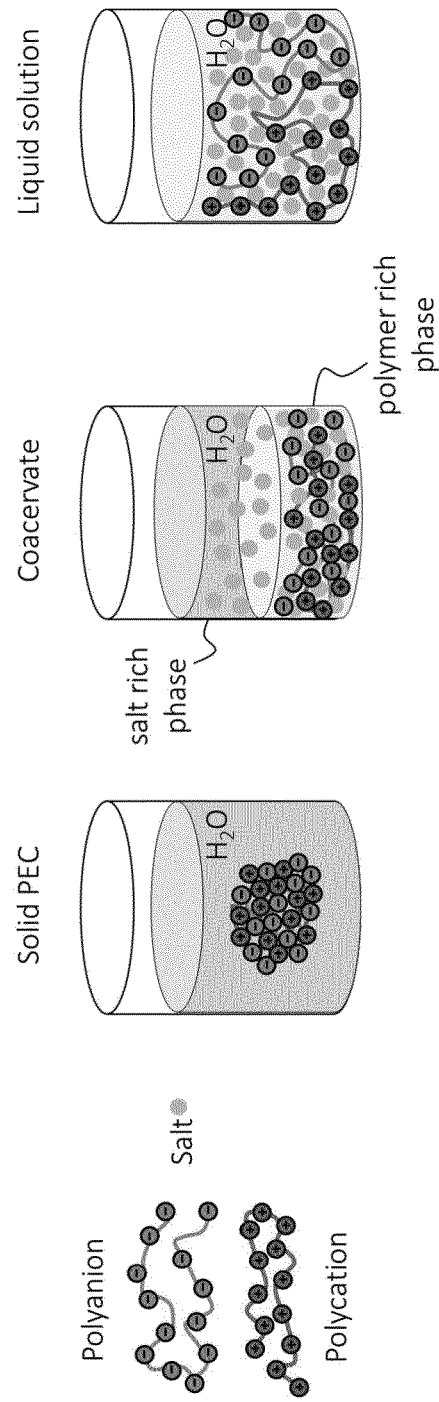

(52) U.S. Cl.
CPC ............ *B01D 69/02* (2013.01); *B01D 69/04* (2013.01); *B01D 69/06* (2013.01); *B01D 69/08* (2013.01); *B01D 69/12* (2013.01); *B01D 71/281* (2022.08); *B01D 71/601* (2022.08); *B01D 71/62* (2013.01); *B01D 71/82* (2013.01); *B01D 2323/06* (2013.01); *B01D 2323/12* (2013.01); *B01D 2323/36* (2013.01); *B01D 2323/40* (2013.01); *B01D 2325/18* (2013.01)

(58) Field of Classification Search
CPC .......... B01D 67/00165; B01D 67/0011; B01D 67/0016; B01D 67/00111; B01D 67/0093; B01D 67/00931; B01D 67/0009; B01D 67/0013; B01D 2323/40; B01D 2325/39; B01D 2325/14; B01D 2325/16; B01D 2325/26; B01D 71/5211; B01D 71/381; B01J 39/20; B01J 41/14; C08J 5/22
USPC .................................................... 210/500.27
See application file for complete search history.

(56) References Cited

U.S. PATENT DOCUMENTS

| | | |
|---|---|---|
| 2010/0108955 A1 | 5/2010 | Song et al. |
| 2018/0318775 A1 | 11/2018 | De Vos |
| 2020/0164317 A1 | 5/2020 | Shull et al. |

OTHER PUBLICATIONS

Wang et al., "The Polyelectrolyte Complex/Coacervate Continuum" Macromolecules, vol. 47, pp. 3108-3116, 2014.
Liu et al, "Rheological Characterization of Liquid-to-solid transitions in bulk polyelectrolyte complexes," Soft Matter, vol. 13, pp. 7332-7340, 2017.
Kelly et al., "Spin-Coated polyelectrolyte coacervate films" ACS Applied Materials & Interfaces, vol. 7, pp. 13980-1386, 2015.
Yang, "Bioprocessing-from Biotechnology to Biorefinery" Bioprocessing for Value-Added Products from Renewable Resources, 2007.
Huang et al., "A salt controlled scalable approach for formation of polyelectrolyte complex fiber," Chinese Journal of Chemistry, vol. 38, No. 5, pp. 465-470, 2020, China.
Michaels et al, "Polycation-Polyanion Complexes: Preparation and Properties of Poly-(Vinylbenzyltrimethylammonium) Poly-(Styrenesulfonate)." The Journal of Physical Chemistry, vol. 65, No. 10, pp. 1765-1773, 1961.
Huang et al., "Polymer complexation for functional fibers," Science China Technological Sciences, vol. 62, No. 6, pp. 931-944, 2019.
Patent Cooperation Treaty (PCT), International Search Report and Written Opinion for Application PCT/EP2021/064794 filed on Jun. 2, 2021, mailed Sep. 21, 2021, International Searching Authority, EP.
Gherasim et al., "Dual-Charged Hollow Fiber Membranes for Low-Pressure Nanofiltration Based on Polyelectrolyte Complexes: One-Step Fabrication with Tailored Functionalities." Applied Materials and Interfaces, 2016, vol. 8 pp. 19145-19157.

* cited by examiner

Fig. 5
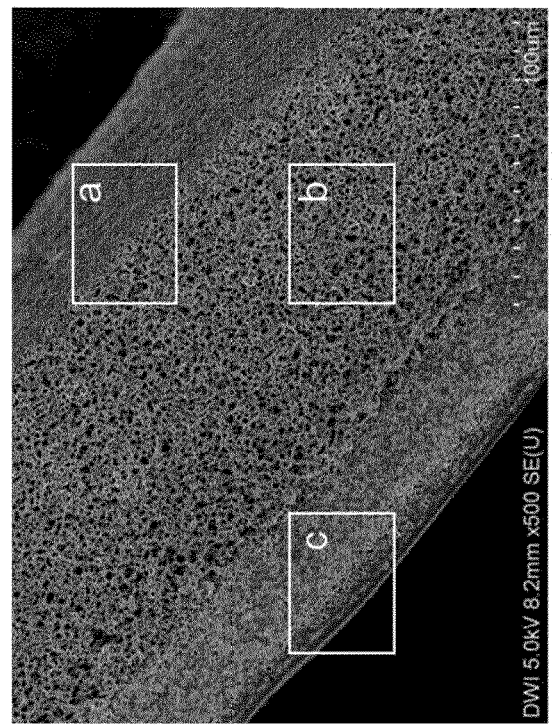
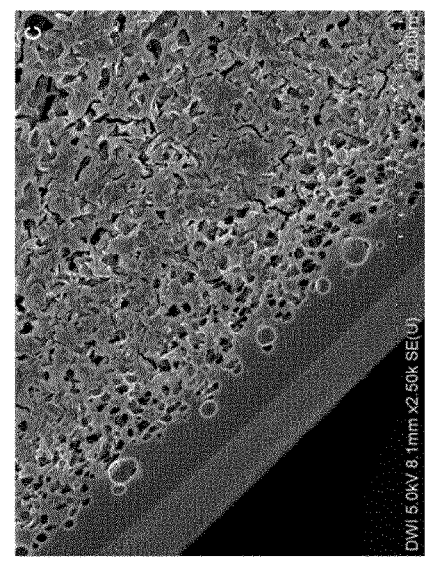
Fig. 5c
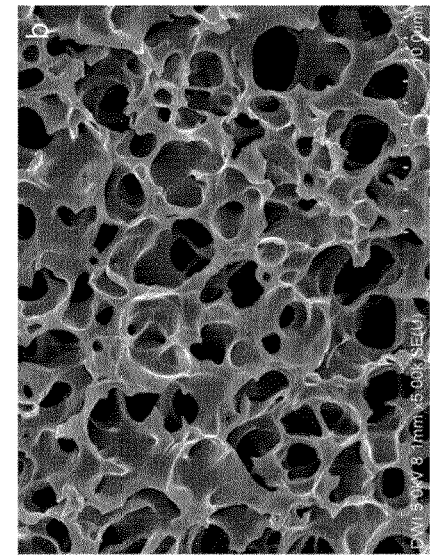
Fig. 5b
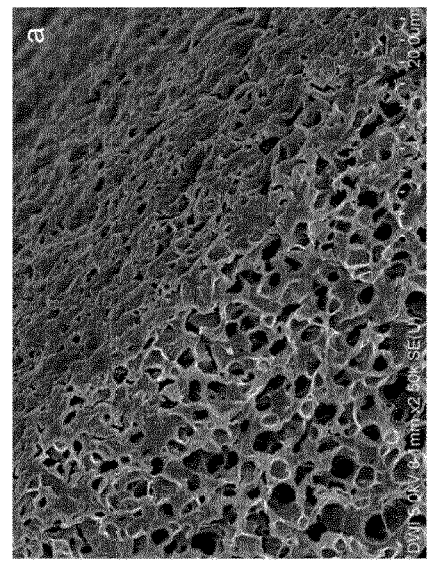
Fig. 5a

Fig. 10
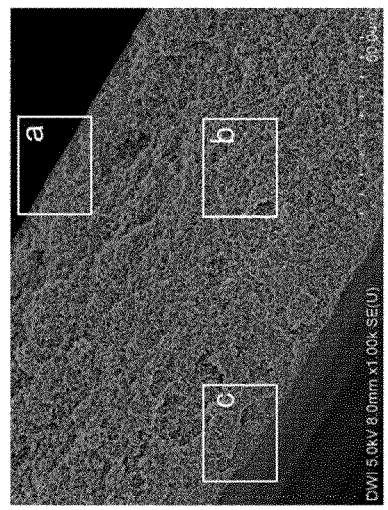
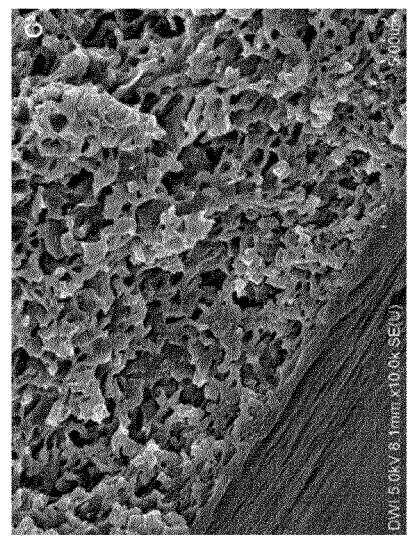
Fig. 10c
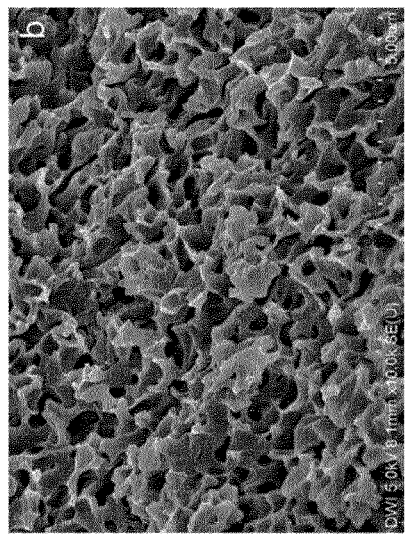
Fig. 10b
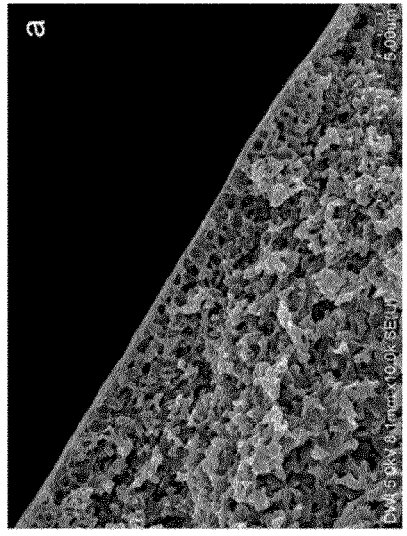
Fig. 10a

METHOD FOR PRODUCING A POLYELECTROLYTE COMPLEX MEMBRANE

CROSS-REFERENCE TO RELATED APPLICATION

This application is a 35 U.S.C. 371 national stage filing of PCT Application No. PCT/EP2021/064794 filed on Jun. 2, 2021, entitled "METHOD FOR PRODUCING A POLYELECTROLYTE COMPLEX MEMBRANE," which claims priority to European Patent Application No. 20178633.2 filed on Jun. 5, 2020, each of which are incorporated herein in their entirety by reference.

The present invention relates to a method for producing a polyelectrolyte complex (PEC) membrane having a predetermined porosity via salt dilution induced phase separation, in which a liquid polymer solution (P) containing polyanions (A) and polycations (C) dissolved in an aqueous medium at an overcritical salt concentration is exposed to an aqueous medium.

The present invention generally relates to polymeric membranes. In the last decade, membrane processes, such as microfiltration (MF), ultrafiltration (UF) and nanofiltration (NF), became important for energy efficient separation tasks in many applications e.g. food industry, production of drinking water and treatment of industrial wastewater. The most common approach to fabricate polymeric membranes is the non-solvent induced phase separation (NIPS). Here, the membrane-forming polymer, typically polyethersulfone (PES), poly(bisphenolsulfone) (PSF) or polyvinylidene difluoride (PVDF), is dissolved in an organic solvent. The organic solvent is miscible with the non-solvent, which is typically water. During immersing the polymer solution in a coagulation bath containing water, water and the organic solvent mix with each other. The organic solvent diffuses out of the polymer solution and is replaced with water, so that the polymer precipitates and a porous membrane structure is formed. The properties of the porous membrane, the pore size and pore structure can be tuned by the polymer and solvent type, the precipitation time and the composition of polymer solution and coagulation bath. Common fabrication processes of MF/UF membranes use hazardous, organic solvents, such as N,N-dimethylformamide (DMF), N,N-dimethylacetamide (DMA), N-methyl-2-pyrrolidone (NMP), or tetrahydrofuran (THF). These solvents are especially dangerous to work with, are environmentally hazardous and need special waste disposal. Even recent EU regulation proposes to restrict the usage of the solvent NMP, for instance, as ruled in the Commission Regulation (EU) 2018/588 of Apr. 18, 2018.

Generally, membranes can be fabricated in different geometries. Most common are flat-sheet and tubular geometries (hollow fibers, capillary, tubular membranes). In MF/UF flat-sheet membrane fabrication, the polymer solution is cast as a film on a flat non-woven substrate, which is thereafter to be immersed into a water bath. The membrane forming polymer precipitates due to NIPS and forms the porous membrane structure. For hollow fiber membrane fabrication, the polymer solution is extruded with a spinneret into a water bath where the hollow fiber is formed. Tubular membranes are fabricated by coating the polymer solution on a tubular non-woven support, which is then immersed into a water bath. In NF membrane fabrication, polymeric UF membranes are used as a porous support material. The support structure is modified in multi-step processes with a selective polyamide layer on top, which is made through interfacial polymerization. In the modification steps, hazardous crosslinker such as trimethyl chloride (TMC) or glutaraldehyde (GA) and solvents such as hexane are used that need special attention during fabrication and waste disposal.

One other upcoming fabrication process for NF membranes is layer-by-layer polyelectrolyte coating. Polyelectrolytes are polymers that have charged functional groups. Polyanions are polyelectrolytes which have a negative charge, whereas polycations are polyelectrolytes which have a positive charge. The ionic interactions between oppositely charged surfaces of the polyanions and polycations result in the complexation of the polyelectrolytes. Through the alternating deposition of polyanions and polycations on a porous membrane surface, a well-defined selective separation layer for NF application can be formed. In contrast to the common polyamide NF formation with hazardous crosslinkers, polyelectrolytes are dissolved in water and are non-hazardous. The polyelectrolyte multilayers, however, are coated on a stabilizing porous UF membrane that is fabricated using NIPS with typical hazardous solvents such as DMF or NMP.

Most commercial NF membranes are flat-sheet membranes because, presently, a continuous fabrication process is only feasible for flat-sheet membranes. The flat-sheet membranes are typically built into spiral wound modules. Hollow fiber and tubular membrane modules, however, have advantages because they are less prone to fouling and a higher packing density can be achieved. Still, the field of polymeric MF/UF/NF membranes lacks a fabrication process that does not need any hazardous solvents. At present, a continuous industrial NF membrane fabrication is only feasible for flat-sheet membranes.

Stable, freestanding polyelectrolyte complexes represent a promising alternative for common polymeric membranes that can be fabricated without using hazardous solvents. In comparison to the layer-by-layer polyelectrolyte coating, no stabilizing porous support structure is required. A polyelectrolyte complex is formed in an aqueous solution, when a polyanion and a polycation are mixed. The polyelectrolyte complex properties and the formation depend on the type of polyelectrolytes and the solution properties. Still, the polyelectrolytes need to be oppositely charged to form the complex. A strong polyelectrolyte dissociates completely at any pH value and is fully charged independently from pH, while the ionization and charge of a weak polyelectrolyte depend on the pH value. Next to the pH value, the ionic strength (salt concentration) in the aqueous solution influences the polyelectrolyte complexation. At high salt concentration, the charged functional groups of any polyelectrolyte are screened by counterions so that the ratio of ionic crosslinks between the polycations and polyanions is reduced.

The complexation and phase behavior of oppositely charged polyelectrolytes at different salt concentrations is topic in different research fields, as can be taken e.g. from the articles by Q. Wang et al., Macromolecules 2014, 47 (9), 3108-3116, and Y. Liu et al., Soft Matter 2017, 13 (40), 7332-7340. Depending on the salt concentration, a mixture of polyanions and polycations can be present in three phases, namely a solid polyelectrolyte complex (PEC), a coacervate and a liquid solution state as shown in FIG. 1. At low salt concentration, polyanions and polycations form a solid polyelectrolyte complex (PEC) in aqueous solution. At higher salt concentrations, the solid complex is transferred to a coacervate containing a polymer rich phase which is in equilibrium with a salt rich phase. At an overcritical salt concentration, the coacervate converts into a homogenous, single phase liquid solution. Starting from a solid polyelectrolyte complex (PEC) at low salt concentration, a liquid solution can be formed by the addition of salt. The phase transition can be reversed by lowering the salt concentration by dilution.

U.S. Pat. No. 10,253,203 B2, for instance, discloses a coating comprising a polyelectrolyte complex (PEC), the PEC comprising an interpenetrating blend of a positively charged polyelectrolyte and a negatively charged polyelectrolyte, the PEC having a thickness of at least 10 µm and a surface roughness of at least about 1 µm. Said rough coating (film) of the PEC is formed from poly(styrene sulfonate) (PSS) as polyanion and poly(diallyldimethylammonium chloride) (PDADMAC) as polycation. As specified in claim 1 of U.S. Pat. No. 10,253,203 B2, said film is prepared by depositing a polyelectrolyte complex dope on a substrate, the polyelectrolyte complex dope comprising the polyanions, polycations, and a salt, wherein the polyelectrolyte complex dope has a doping level with the salt of between 0.70 and 0.999; and rinsing the polyelectrolyte complex dope with an aqueous solution to remove the salt to an endpoint doping level of less than 0.5. That is, after a solid PEC is formed in an aqueous solution, through the addition of sodium chloride (NaCl) or potassium bromide (KBr) as a doping salt, the solid is transferred into a coacervate. After having been separated from the salt rich phase, the polymer rich phase (i.e. the polyelectrolyte complex dope having a doping level of 0.70 to 0.999) is spin-coated to thin films. The films are then immersed into a water bath so that the polyions precipitate, thereby forming a solid polyelectrolyte complex film. However, as it is also described by K. D. Kelly et al., ACS App. Mater. Interfaces 2015, 7 (25), 13980-13986, for the polyelectrolyte complexation from the coacervate phase, it is necessary to firstly produce a starting polyelectrolyte complex, which is isolated (i.e. removed from the aqueous medium), washed for three days to remove residual NaCl, dried at 120° C. and subsequently ground to a fine powder. Only thereafter, the coacervate can be prepared by adding water and KBr to the starting polyelectrolyte complex which takes a few days. After extraction of the polymer rich phase from the salt rich phase, the film can be obtained after precipitation in the coagulation bath.

WO 2018/208902 A1 discloses a method for making a porous polyelectrolyte complex film having a predetermined porosity, the method comprising coating the surface of a substrate with a polyelectrolyte (PE) coacervate mixture, the PE coacervate mixture comprising a cationic polymer, an anionic polymer, water, and a salt, the PE coacervate having a salt concentration; exposing the coating to an aqueous medium having another salt concentration, for a time to induce solidification of polyelectrolyte complexes (PECs) in the form of a PEC film having pores distributed throughout, wherein a difference between the salt concentration of the PE coacervate mixture and the salt concentration of the aqueous medium is selected to achieve a predetermined porosity for the porous PEC film. In particular, a coacervate is produced with the polyanion PSS and the polycation poly(N—$C_{1-3}$ alkyl-4-vinyl pyridinium) (QVP-C1, QVP-C2 and QVP-C3, respectively) in a similar multistep process described in U.S. Pat. No. 10,253,203 B2. Said polyions form solid polyelectrolyte complexes in aqueous solution. By adding KBr, the solid polyelectrolyte complexes can be transferred into coacervates after annealing at 60° C., and the polymer rich phases are described to be cast on an aluminum plate and immersed into a water bath, resulting polyelectrolyte complex membrane layers. The polycations QVP-C1, QVP-C2, and QVP-C3 are, however, not commercially available and must be synthesized with a quaternization reaction using hazardous iodomethane, bromoethane, and bromopropane, respectively. Furthermore, the transfer from solid polyelectrolyte complex to a coacervate takes between one day and one month.

US 2018/318775 A1 discloses a method for creating a porous film through aqueous phase separation, the method comprising the steps of (I) providing an aqueous polymer solution comprising a dissolved trigger-responsive polymer; (II) contacting the aqueous polymer solution with an aqueous coagulation solution in which the trigger-responsive polymer is not soluble; and (III) allowing solvent exchange between the aqueous polymer solution and the coagulation solution to form a porous film. Here, a combination of a strong polyanion PSS and a weak polycation, namely poly (allylamine hydrochloride) (PAH) or polyethylene imine (PEI), is used to fabricate a polyelectrolyte complex membrane. The weak polycation is transferred to an uncharged state by pH adjustment at a high pH value (pH 13). Then, the polyanion is added and the liquid solution is cast on a glass plate and immersed into a water bath at a very low pH. Through the pH shift, the amine groups of the weak polycation become protonated and charged, leading to the formation of a polyelectrolyte complex film. Micro-, ultra- and nanofiltration membrane properties were proven with filtration experiments as it is also described in M. I. Baig et al., Adv. Funct. Mater. 2019, 30 (5), 1907344. In this fabrication process, however, hazardous components, such as HCl and NaOH, are used for pH adjustment and the pH shift phase separation process is limited to the use of at least one weak polyelectrolyte.

Further, A. S. Michaels et al., J. Phys. Chem., 1961, 65 (10), 1765-1773, discloses a preparation of a polyelectrolyte complex in which poly(sodium styrene sulfonate) (NaSS) as a polyanion and poly(vinylbenzyltrimethylammonium chloride) (VBTAC) as a polycation are dissolved in a solution containing acetone as an organic solvent and water. W. Huang et al., Chin. J. Chem., 2020, 38, 465-470, discloses the formation of polyelectrolyte complex fiber of alginate (ALG) and poly(diallyldimethylammonium chloride) (PDDA). In said article, a salt doped ALG/PDDA solution is extruded into an ethanol coagulation bath and the exchange of water with ethanol causes the formation of the fibers.

In summary, the state of the art shows the potential to fabricate MF-/UF-/NF membranes based on aqueous phase inversion processes with polyelectrolytes. However, these processes described e.g. in U.S. Pat. No. 10,253,203 B2 and WO 2018/208902 A1 require multiple and time-consuming steps of firstly preparing a coacervate followed by an extraction of the polymer rich phase from the salt rich phase resulting in a decreased yield. Also, the thermodynamic equilibrium required between the salt rich and polymer rich phases limits a flexible tunability of the membranes. On the other hand, the phase separation process via pH shift as described in US 2018/318775 A1 requires strong acids and this process is limited on the combination of weak/strong polyelectrolytes, thereby resulting in a limited tunability of the membranes. Other methods require organic solvents. Thus, there is a lack of a continuous and cheap fabrication method of flat-sheet, hollow fiber and tubular composite membranes.

Based on the above, the object of the invention is to provide a continuous and cheap fabrication method of flat-sheet, hollow fiber and tubular composite membranes, in which the use of hazardous components can be minimized.

According to the present invention, the above object is achieved by providing a method for producing a polyelectrolyte complex (PEC) membrane having a predetermined porosity via salt dilution induced phase separation as characterized in claim 1. Specific embodiments of the present invention are set out in the dependent claims.

Specifically, the present invention provides a method for producing a polyelectrolyte complex (PEC) membrane having a predetermined porosity via salt dilution induced phase separation, the method comprising the following steps:

(i) providing a liquid polymer solution (P) having a homogeneous single phase at an overcritical salt concentration with the salt concentration being higher than the salt concentration at the critical point by mixing polyanions (A) and polycations (C) in an aqueous medium, the liquid polymer solution (P) containing the polyanions (A) and polycations (C) dissolved in the aqueous medium in a state where the polyanions (A) and polycations (C) do not form a polyelectrolyte complex (PEC), wherein the complexation of the polyelectrolyte is suppressed by the overcritical salt concentration of the liquid polymer solution (P), which is adjusted either by the addition of a salt before the mixing step and/or by the addition of the salt after the mixing step; and (ii) thereafter, without preparing the solid polyelectrolyte complex (PEC) or a coacervate phase, exposing the overcritical salt rich liquid polymer solution (P) having a homogeneous single phase to an aqueous medium so as to decrease the salt concentration, which triggers the complexation of the polyelectrolyte and precipitation of the polyelectrolyte complex (PEC), thereby forming the polyelectrolyte complex (PEC) membrane, wherein the overcritical salt rich liquid polymer solution (P) has a viscosity, measured as dynamic viscosity at room temperature using a rheometer, of 10 to 100000 mPa·s before exposing it to the aqueous medium in step (ii), wherein the salt concentration of the overcritical salt rich liquid polymer solution (P) in step (i) is sufficiently high so that the formation of the solid polyelectrolyte complex (PEC) and of the coacervate phase can be suppressed, and wherein the method does not employ any organic solvent.

According to the present invention, PEC membranes can be produced via a novel salt dilution induced phase separation process. In contrast to common fabrication processes, where organic solvents are required, this process can be conducted with no need of any organic or hazardous solvents. The PEC membranes according to the present invention are fabricated using a novel salt dilution induced phase separation process, in which the polyanions (A) and polycations (C) are dissolved in an aqueous medium with an overcritical salt concentration, which suppresses complexation and forms a homogeneous liquid polymer solution (P). Complexation of the polyelectrolytes in the liquid polymer solution (P) is simply achieved through salt dilution by exposing the overcritical salt rich liquid polymer solution (P) to an aqueous medium so as to decrease the salt concentration. By adjusting the solutions of the polyanions (A) and polycations (C) and the process conditions, membrane properties can be tailored in the range of microfiltration (MF), ultrafiltration (UF), nanofiltration (NF), and reverse osmosis (RO). Besides, the PEC membranes according to the present invention can be used as a diffusion dialysis (DD) membrane, a contactor membrane as well as an ion-exchange membrane, or a gas separation membrane.

In addition, according to the present invention, all types of membrane geometries, i.e. flat-sheet, hollow fiber and tubular composite, can be fabricated.

In contrast to the state of the art, according to the present invention, the liquid phase is used for membrane formation. Therefore, no time-consuming fabrication of the coacervate and no separation of the polymer rich phase are required. Also, no harmful components for polyelectrolyte synthesis, acids or crosslinkers are used in the method according to the present invention so that the use of hazardous components can be minimized or completely avoided. Preferably, the entire process of producing the PEC membrane according to the present invention does not need any hazardous components.

Further, the preparation of the liquid polymer solution (P) is not limited to the type of polyelectrolytes used (strong/weak). The mechanism of suppressing complexation through an overcritical salt concentration works for weak polyelectrolytes at any degree of ionization, as well as for fully ionized strong polyelectrolytes. Critical salt concentrations, however, vary by the type of functional group and degree of ionization. Thus, the salt dilution induced phase separation according to the present invention is not limited and can be used for any type of polyelectrolyte. Furthermore, the polyelectrolyte combination is not limited to a weak polyelectrolyte as in the pH shift process.

The present invention including preferred embodiments will now be described in more detail along with the accompanying figures. The figures show:

FIG. 1: The phase behavior of oppositely charged polyelectrolyte at different salt concentrations resulting in a solid polyelectrolyte complex (PEC), a coacervate and a liquid solution state.

Figure 2:
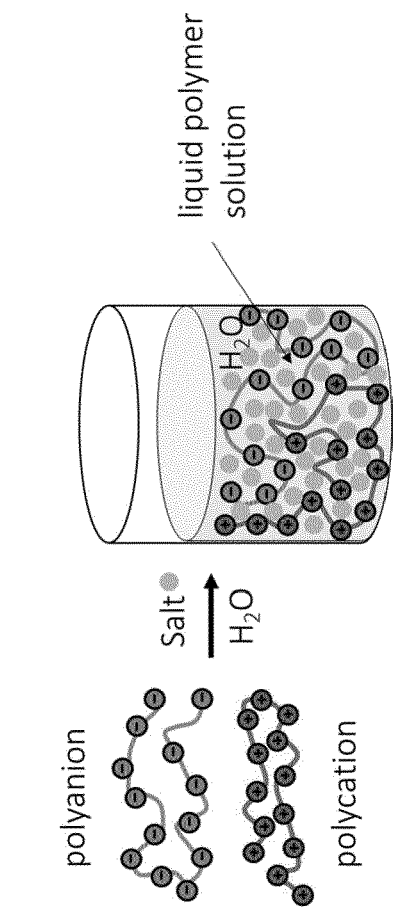

FIG. 2: The preparation of the polyelectrolyte liquid polymer solution (P).

Figure 3:
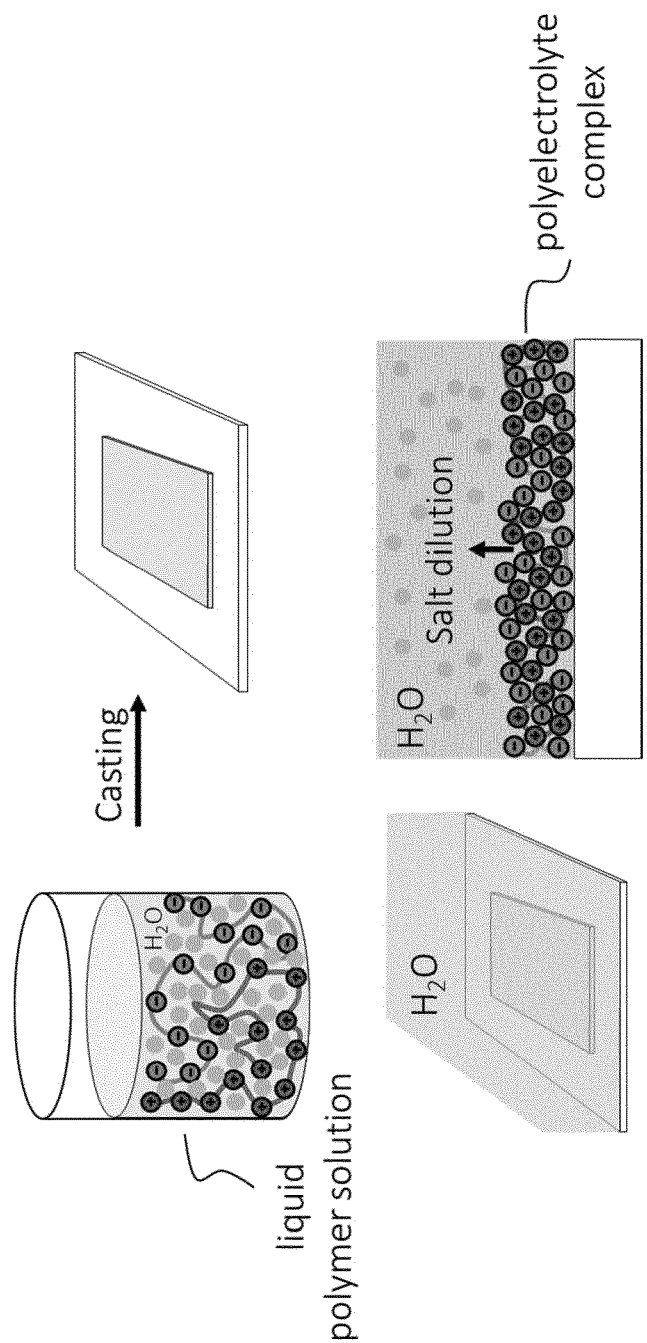

FIG. 3: The fabrication of PEC flat-sheet membranes.

Figure 4B:
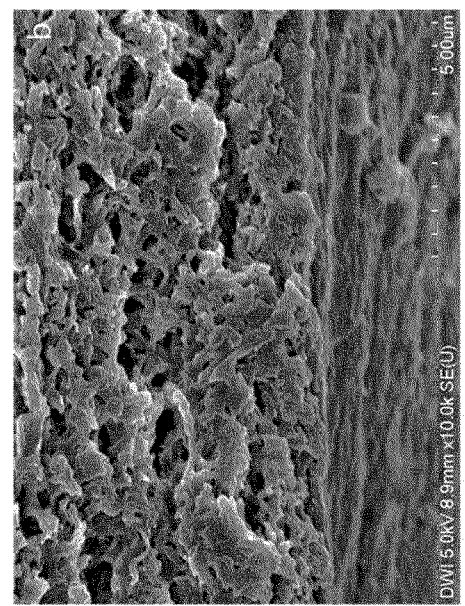
Figure 4:
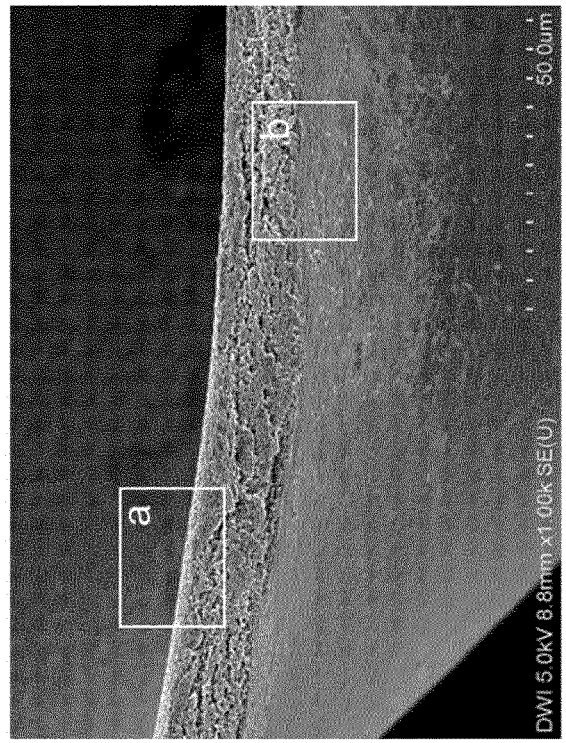

FIG. 4: Field emission scanning electron microscope images of the PEC flat-sheet membrane obtained in Example 1 that is formed with a molar monomer ratio of 45:55 of PSS and PDADMAC.

FIG. 5: Field emission scanning electron microscope images of the PEC flat-sheet membrane obtained in Example 2 that is fabricated with an equimolar monomer ratio (50:50) of PDADMAC and PSS.

Figure 6:
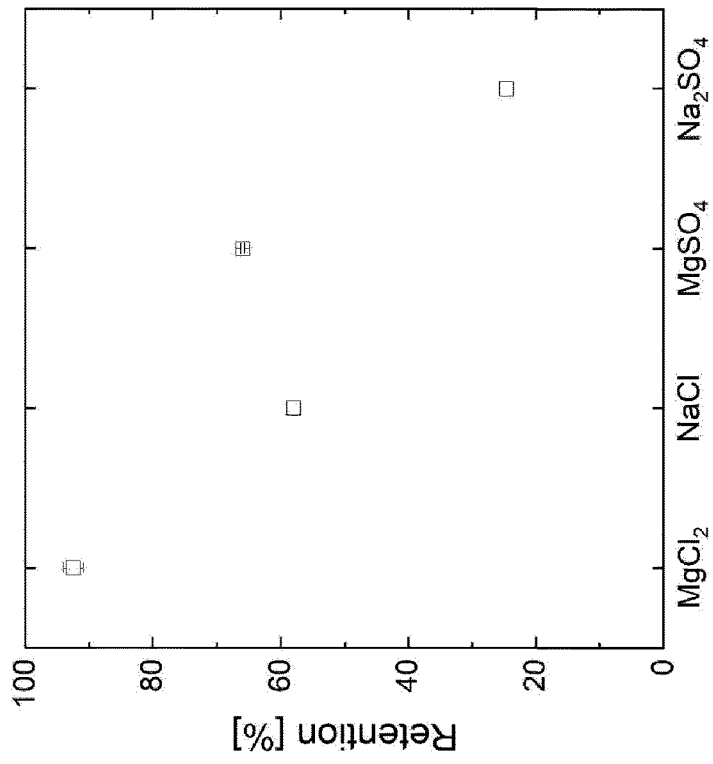

FIG. 6: Salt retention hierarchy of the PEC flat-sheet membrane obtained in Example 2.

Figure 7:
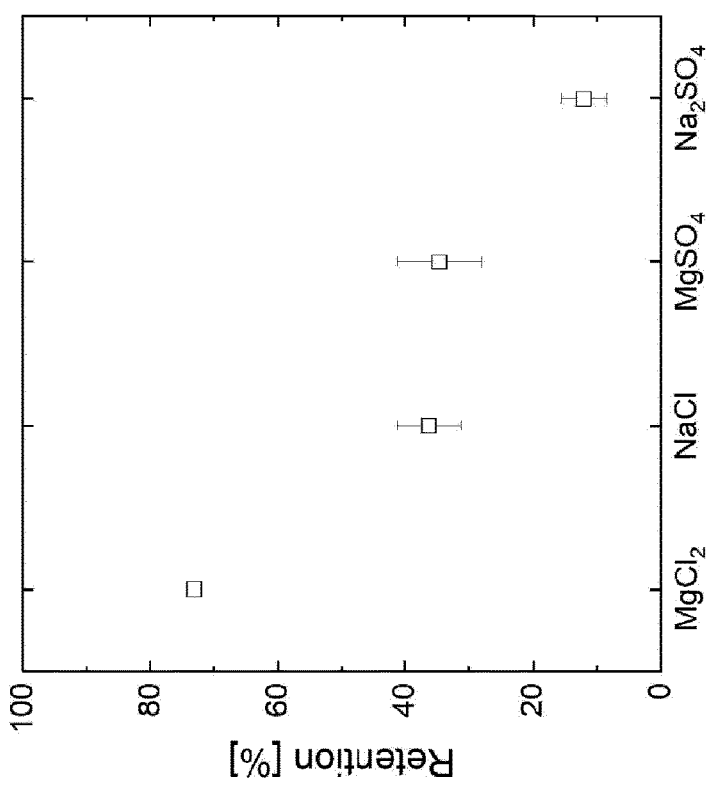

FIG. 7: Salt retention hierarchy of the PEC hollow fiber membrane obtained in Example 3.

Figure 8:
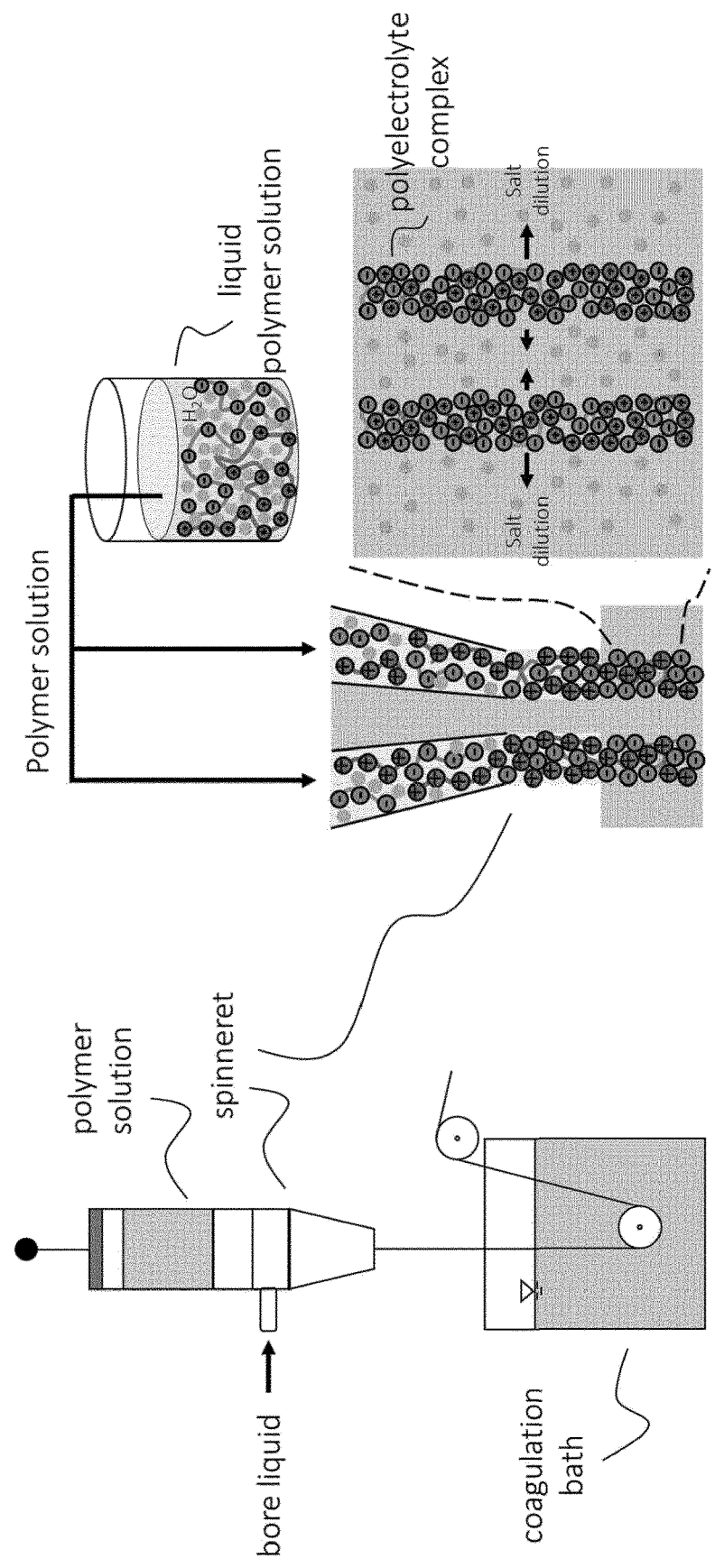

FIG. 8: The fabrication of PEC hollow fiber membranes.

Figure 9:
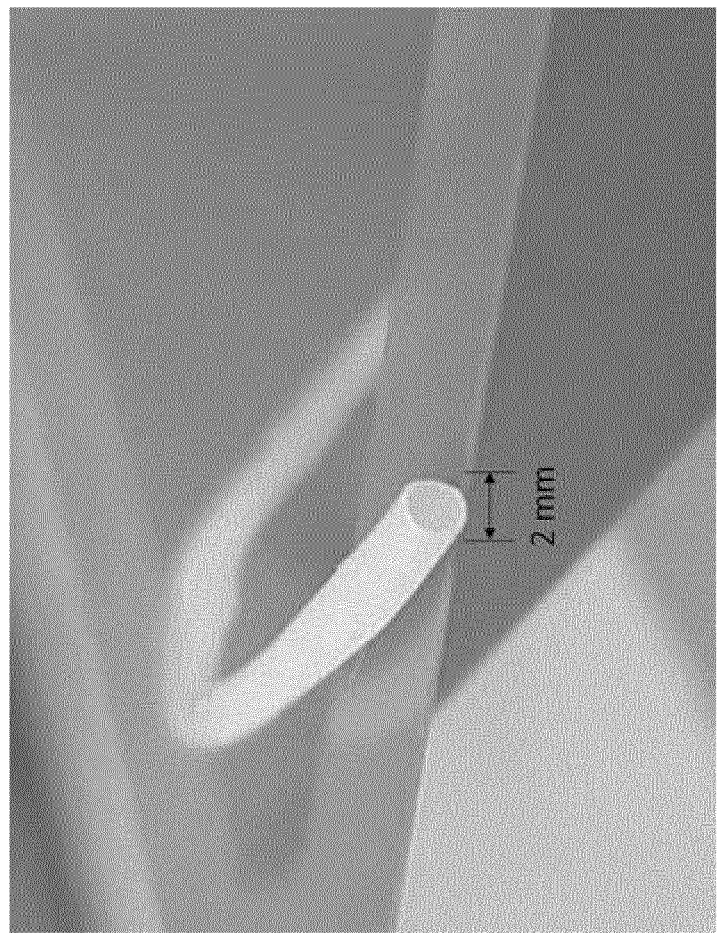

FIG. 9: Picture of the PEC hollow fiber obtained in Example 3.

FIG. 10: Field emission scanning electron microscope images of the PEC hollow fiber membrane obtained in Example 3.

Figure 11:
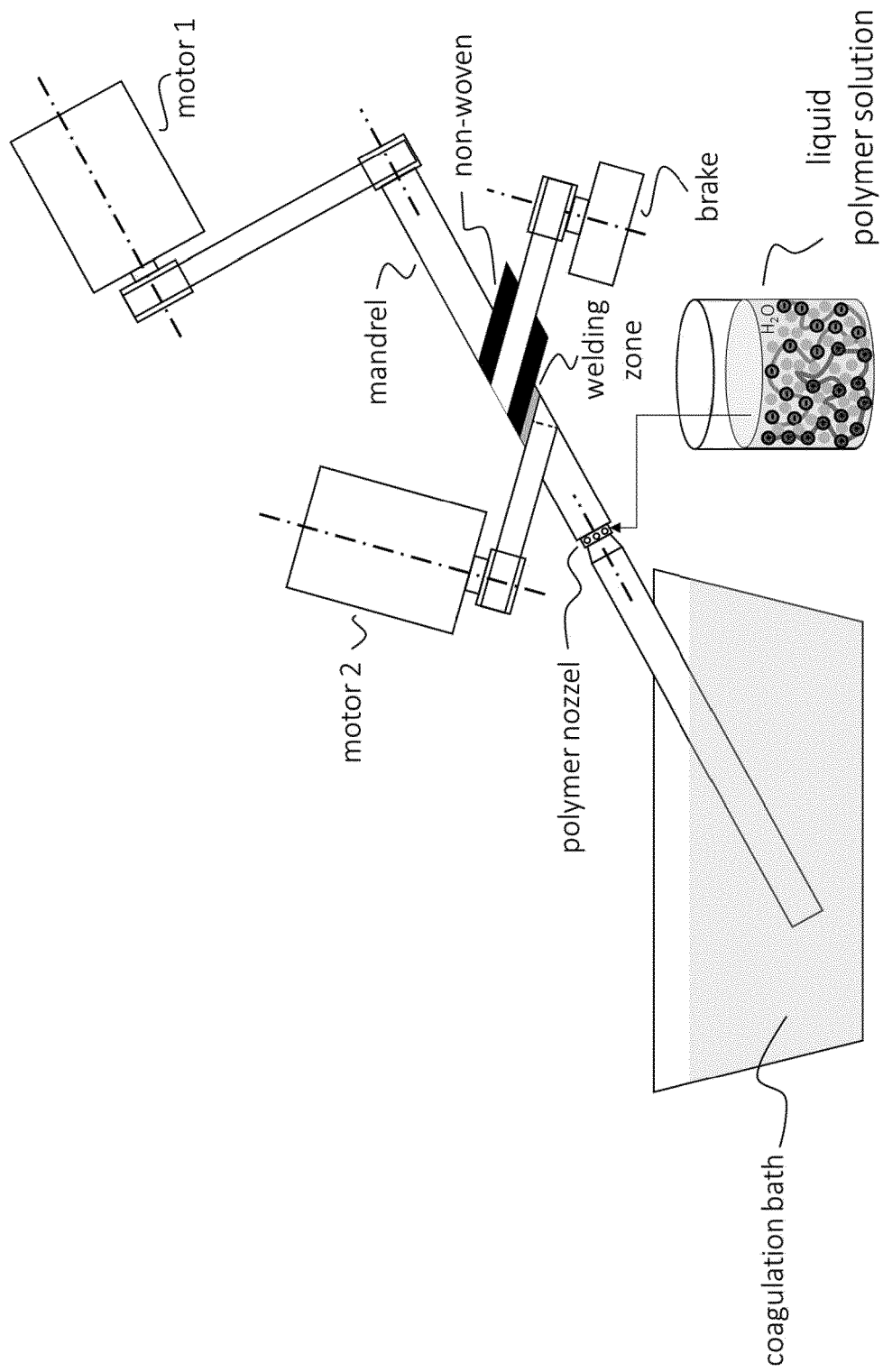

FIG. 11: The fabrication of PEC tubular composite membranes.

Figure 12:
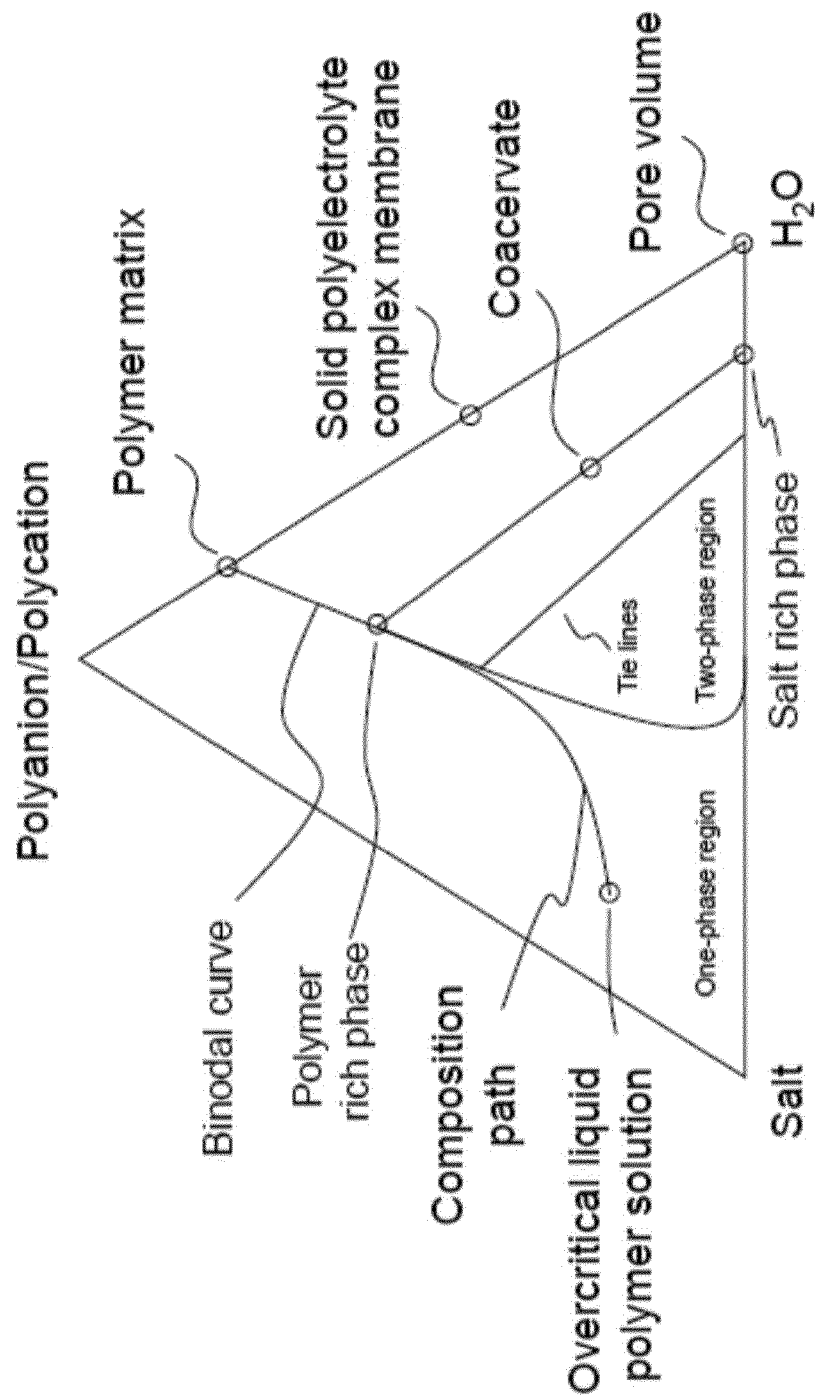

FIG. 12: Three-component phase diagram with polyanion/polycation, salt as a solvent, and $H_2O$ as non-solvent.

As mentioned above, the present invention is based on a novel approach for producing PEC membranes via a salt dilution induced phase separation process from an overcritical salt concentration. This process represents a simple, cheap and flexible means for producing PEC membranes having a predetermined porosity. According to the present invention, the expression "membrane(s) having a predetermined porosity" is not particularly restricted and includes any material which is porous, and thus being suited for filtering a fluid (liquid or gas), and materials which are only partially permeable such as reverse osmosis (RO) membranes. In particular, the PEC membrane according to the present invention is preferably a microfiltration (MF) membrane, an ultrafiltration (UF) membrane, a nanofiltration (NF) membrane, a reverse osmosis (RO) membrane, a diffusion dialysis (DD) membrane, a contactor membrane, an ion-exchange membrane, or a gas separation membrane.

Filtration membranes are classified according to IUPAC recommendations based on their retentive properties and pore sizes. Based on the pore size, there is generally a distinction between microfiltration membranes (average pore size: 0.1 to 10 µm), ultrafiltration membranes (average pore size: 0.01 to less than 0.1 µm), nanofiltration membranes (average pore size: 0.001 to less than 0.01 µm) and reverse osmosis membranes (average pore size: 0.0001 to less than 0.001 µm) as described e.g. by Shang-Tian Yang, Bioprocessing for Value-Added Products from Renewable Resources, 2007. However, ultrafiltration membranes as well as those having even smaller pore sizes are commonly classified by their retentive properties, i.e. by specifying the limit at which 90% (or 95%) of the molecules of a particular molar mass are retained (molecular weight cut-off, MWCO).

With regard to the retentive properties of the membranes, a similar definition can be made on the basis of the molecular weight cut-off (MWCO). MWCO refers to the solute with the lowest molecular weight in daltons (Da), in which 90% of the solute is retained by the membrane, or alternatively to the molecular weight of a molecule in daltons, in which 90% of the molecules with this molecular weight are retained by the membrane. Filtration membranes with an MWCO of test molecules or particles with a hydrodynamic radius of 0.1 to 10 µm are referred to as microfiltration membranes. Corresponding assignments of MWCO areas are as follows: ultrafiltration membranes: 0.01 µm to less than 0.1 µm; nanofiltration membranes: 0.001 µm to less than 0.01 µm; and reverse osmosis membranes: 0.0001 µm to less than 0.001 µm.

Thus, according to the present invention, the following classification is used:
microfiltration membranes having pore diameters between 0.1 to 10 µm as characterized by field emission scanning electron microscope (FESEM),
ultrafiltration membranes having a MWCO of about 2000 to 100000 Da
nanofiltration membranes having a MWCO of about 200 to less than about 2000 Da; and
reverse osmosis membranes having a MWCO of less than about 200 Da.

The method for determining the MWCO of the PEC membranes is described in the Examples below.

The method for producing the PEC membrane according to the present invention comprises a first step (i), in which a liquid polymer solution (P) having a homogeneous single phase at an overcritical salt concentration is provided by mixing polyanions (A) and polycations (C) in an aqueous medium. In the liquid polymer solution (P), the polyanions (A) and polycations (C) are dissolved in the aqueous medium in a state where the polyanions (A) and polycations (C) do not form a polyelectrolyte complex (PEC). According to the present invention, the complexation of the polyelectrolyte is suppressed by the overcritical salt concentration of the liquid polymer solution (P), which is adjusted either by the addition of a salt before the mixing step and/or by the addition of the salt after the mixing step. Notably, the concentration of the salt in the liquid polymer solution (P) is higher than the salt concentration at the critical point as will be explained in more detail herein—below.

The mixing step of the polyanions (A) and polycations (C) is not particularly restricted. For instance, step (i) of the method according to the present invention may include providing a liquid solution which contains the polyanions (A) dissolved in an aqueous medium, and providing another liquid solution which contains the polycations (C) dissolved in an aqueous medium. Thereafter, these separately prepared liquid solutions can be mixed to prepare the liquid polymer solution (P) having a homogeneous single phase at an overcritical salt concentration. As mentioned above, the salt can be added before the mixing step and/or the salt can be added after the mixing step. For instance, in order to adjust the salt concentration in the liquid polymer solution (P), the salt may be added to the liquid solution containing the polyanions (A) and/or to the liquid solution containing the polycations (C) before the mixing step. In addition, it is also possible to add the salt after the mixing step.

Besides, step (i) of the method according to the present invention encompasses a procedure, in which the polyanions (A) and/or the polycations (C) are in a dried pure solid form, such as a powder. In such a case, when e.g. the polycation (C) is present as a powder, it is possible to add this powder to a solution in which the polyanions (A) are dissolved in the aqueous medium at an overcritical salt concentration. Similarly, when the polyanion (A) is present as a powder, it is possible to add this powder to a solution in which the polycations (C) are dissolved in the aqueous medium at an overcritical salt concentration.

Preferably, as shown in FIG. 2, the liquid polymer solution (P) is prepared by dissolving the polyanion (A) (or polycation (C), respectively) in an aqueous medium containing the salt at an overcritical concentration, and thereafter, adding the polycation (C) (or polycation (A), respectively) to this solution as a separately dissolved solution.

The polyanions (A) used in the present invention are not particularly limited and may include any polymer having at least one anionic functional group, i.e. polyanions (A) are charged polymers (i.e. polyelectrolytes) which comprise one or more monomer repeating units that are negatively charged. According to a preferred embodiment, the anionic functional group is selected from the group consisting of sulfonates, carboxylates, and phosphates. The polymers may be homopolymers or copolymers including alternating-, random-, block- and graft copolymers. In addition, the polyanions (A) used in the present invention may be copolymers having a combination of charged and/or neutral monomers, such as negative and neutral, positive and negative, or positive, negative, and neutral, as long as the negative charge is predominant in the copolymer.

Non-limiting examples of such polyanions (A) are poly(styrene sulfonate) (PSS), poly(vinylsulfonic acid) (PVSA), poly(acrylic acid) (PAA), poly(methacrylic) acid (PMAA), Alginate, polyphosphates, poly(vinylphosphonic acid) (PVPA), poly(acrylamido-2-methylpropanesulfonate) (PolyAMPS), sulfonated polyethersulfone (SPES), sulfonated polysulfone (sPSU), and sulfonated poly(ether ether ketone) (SPEEK). These polyanions (A) may be used singly or in combination of two or more. That is, the liquid polymer solution (P) may contain different kinds of polyanions (A), e.g. PSS and PVSA, dissolved in the aqueous medium.

Also, the polycations (C) used in the present invention are not particularly limited and may include any polymer having at least one cationic functional group, i.e. polycations (C) are charged polymers (polyelectrolytes) which comprise one or more monomer repeating units that are positively charged. According to a preferred embodiment, the cationic functional group is selected from the group consisting of primary amines, secondary amines, tertiary amines, quaternary amines, amides, and pyridinium moieties. The polymers may be homopolymers or copolymers including alternating-, random-, block- and graft copolymers. In addition, the polycations (C) used in the present invention may be copolymers having a combination of charged and/or neutral monomers, such as positive and neutral, positive and negative, or positive, negative, and neutral, as long as the positive charge is predominant in the copolymer.

Non-limiting examples of such polycations (C) are polyethylene imine (PEI), poly(allylamine) hydrochloride (PAH), poly(diallyldimethylammonium chloride) (PDADMAC), Chitosan, polyvinyl amine (PVAm), poly(2-diethylaminoethylmethacrylate) (PDEA), poly(N-isopropyl-acrylamide) (PNIPAM), poly(-vinylpyridinium) (P4VP), and poly(-aminostyrene) (PAS). These polycations (C) may be used singly or in combination of two or more. That is, the liquid polymer solution (P) may contain different kinds of polycations (C), e.g. PEI and PAH, dissolved in the aqueous medium.

The above-mentioned polyanions (A) and polycations (C) can be classified into strong and weak polyelectrolytes. Generally, polyanions (A) having at least one sulfonate group are considered as strong polyelectrolytes, and polycations (C) having at least one quaternary amine group are also considered as strong polyelectrolytes. Thus, among the aforementioned examples of polyanions (A), PSS, PVSA, PolyAMPS, SPES, sPSU and SPEEK are classified as strong polyanions (A), whereas PAA, PMAA, Alginate, polyphosphates and PVPA are classified as weak polyanions (A). Similarly, PDADMAC and PDEA are classified as strong polycations (C), whereas PEI, PAH, Chitosan, PVAm, PNIPAM, P4VP and PAS are classified as weak polycations (C).

As mentioned above, the salt dilution induced phase separation process according to the present invention is not limited and can be used for any type of polyelectrolytes, i.e. the polyelectrolyte combination is not limited to a weak polyelectrolyte as in the pH shift process. The mechanism of suppressing complexation by the overcritical salt concentration works for weak polyelectrolytes at any degree of ionization, as well as for fully ionized strong polyelectrolytes. Particularly preferred combinations of polyanions (A) and polycations (C) include the following: PSS (strong)/PEI (weak), PSS (strong)/PAH (weak), PSS (strong)/PDADMAC (strong), PVSA (strong)/PDADMAC (strong), PVSA (strong)/PEI (weak), PVSA (strong)/PAH (weak), PAA (weak)/PDADMAC (strong), PAA (weak)/PEI (weak), and PAA (weak)/PAH (weak).

According to a preferred embodiment of the present invention, both the polyanions (A) and polycations (C) are strong polyelectrolytes, the functional groups of which are selected from the group consisting of sulfonates and quaternary amines, respectively. More preferably, the polyanions (A) are one or more selected from the group consisting of PSS, PVSA, PolyAMPS, SPES, sPSU and SPEEK, and the polycations (C) are one or more selected from the group consisting of PDADMAC and PDEA.

As mentioned above, the polymers of the polyanions (A) and polycations (C) used in the present invention are not particularly limited. This also applies for the molecular weight or chain length of the polymers. Preferably, the molecular weight of the polyanions (A) and polycations (C) used according to the present invention, expressed in terms of the weight average molecular weight (Mw), is in the range of 1000 Da to 10000 kDa, more preferably 10 kDa to 10000 kDa, particularly preferably 300 kDa to 1000 kDa. The weight average molecular weight Mw of the polyanions (A) and polycations (C) refers to the value specified by the manufacturer's data. In case these data are not available, the weight average molecular weight Mw of the polyanions (A) and polycations (C) is determined by gel permeation chromatography (GPC) normalized to commonly used standards i.e. polystyrene or polyethylene glycol/oxide (PEG/PEO) known to the skilled person.

According to the present invention, the polyanions (A) and polycations (C) are dissolved in the aqueous medium not including an organic solvent. The aqueous medium is not particularly limited and refers to any aqueous solution. Preferably, the aqueous medium is water which however may contain e.g. a salt or any other additive dissolved therein (excluding organic solvents). These additives and salts, however, preferably exclude materials influencing the pH of the aqueous medium, such as acids and bases.

Further, the polyanions (A) and polycations (C) are dissolved in the aqueous medium with an overcritical salt concentration with the salt concentration being higher than the salt concentration at the critical point, which suppresses complexation and forms a liquid solution, i.e. the overcritical salt rich liquid polymer solution (P) in step (i). The salt concentration of the overcritical salt rich liquid polymer solution (P) in step (i) must be sufficiently high so that the formation of the solid polyelectrolyte complex (PEC) and of the coacervate phase can be suppressed. However, the overcritical salt concentration varies by the type of functional group and degree of ionization of the polyanions (A) and polycations (C) as well as by the salt added to the aqueous medium. The "overcritical" salt concentration (or ionic strength) in the liquid polymer solution (P) is the point at which the dissolved polyelectrolytes show no interactions with each other. As mentioned above and shown in FIG. 1, at a low salt concentration, polyanions (A) and polycations (C) form a solid PEC in aqueous solution. An increase in salt concentration leads to an increase in salt and water content in the PEC, resulting in that polymer ion pairs are broken in the PEC. At higher salt concentrations, the solid complex is transferred to a coacervate containing a polymer rich phase which is in equilibrium with a salt rich phase. At an overcritical salt concentration, all interactions between the polyanions (A) and polycations (C) are broken forming a homogenous, single phase liquid solution.

According to the present invention, the polyanions (A) and polycations (C) are dissolved in the aqueous medium at an overcritical salt concentration, which means that the salt concentration in the liquid polymer solution (P) in step (i) is higher than the salt concentration at the critical point. Thermodynamically, the critical point is defined as the distinct point in a multicomponent liquid mixture, where the binodal, spinodal, and the tie lines meet in one point, so there is no phase separation (cf. FIG. 12). FIG. 12 shows a three-component liquid mixture containing a one-phase and a two-phase region which are separated by the binodal. In FIG. 12, the two-phase region, the phase states, and equilibria are represented by the binodal. The equilibria of the two phases are given by the tie lines, linking the equilibrium compositions of the two phases on the binodal. The distinct point, where spinodal (not shown), binodal and tie lines meet in one point is defined as the critical point. At the critical point, no phase separation occurs. The critical salt concentration is defined by the concentration of salt in the critical point. According to the present invention, the "overcritical" salt concentration is defined by a salt concentration higher than the salt concentration at the critical point. At overcritical salt concentrations, an overcritical liquid polymer solution single phase is present.

In this regard, it should be noted that the above correlation of salt concentration and complexation in PECs is described in U.S. Pat. No. 10,253,203 B2 as "doping level". The lowest doping level of 0.0 (0%) is described as a state where all the positively charged polyelectrolyte repeating units are paired with all the negatively charged polyelectrolyte repeating units, which corresponds to the maximum level (100%) of ionic crosslinking in the PEC. The highest doping level of 1.0 (100%) is described as a state, where all charged polyelectrolyte repeating units are paired with a salt ion, which means that the polyelectrolytes are dissociated. Thus, the "overcritical" salt concentration referred to in the present invention corresponds to a doping level of higher than 1.0 when the convention described in U.S. Pat. No. 10,253,203 B2 is applied.

According to a preferred embodiment of the present invention, the salt concentration of the overcritical salt rich liquid polymer solution (P) in step (i) is in the range of 0.01 mol/L to 7.0 mol/L, more preferably 0.1 mol/L to 5.0 mol/L. Even more preferably, the salt concentration of the overcritical salt rich liquid polymer solution (P) in step (i) is at least 0.5 mol/L.

The degree of the ionic strength due to the overcritical salt concentration in the liquid polymer solution (P) is essential for the method according to the present invention. The salt concentration beyond the critical point significantly influences the kinetics of the phase inversion process, which are in addition to the composition of the polyelectrolytes (A) and (C) and further conditions such as the temperature responsible for the formation of a wide variety of pore structures of the PEC membrane. In particular, by adjusting the concentration gradient between the liquid polymer solution (P) in step (i) and the aqueous medium used in step (ii) (which will be herein-after also referred to as "non-solvent"), it is possible to control the properties of the PEC membrane. For instance, a rapid salt dilution, which is achieved by a high concentration gradient, affords smaller pore sizes to the point of a thin, dense surface layer. By that dense layer, the diffusive transport of salt out of the polymer phase is decreased. As a result, a porous structure having larger pore size is formed underneath.

According to the present invention, the salt added so as to prepare the overcritical salt rich liquid polymer solution (P) is not particularly limited. The salt may comprise any cation selected from the group consisting of alkali metal cations, alkaline earth metal cations, transition metal cations, semi-metallic cations, and organic cations such as amines or quaternary ammonium ions. The salt(s) may comprise a mixture of two or more of any of these cations. Among the alkali metal cations, lithium (Li), sodium (Na), potassium (K), and rubidium (Rb) are preferred, sodium and potassium being particularly preferred. The anion may be selected from the group consisting of halide anions, oxoanions, and organic anions, or any combination thereof. Among those halide anions, fluoride (F), chloride (Cl), bromide (Br), and iodide (I) are preferred. The oxoanions may be sulfonate, sulfate, sulfite, phosphate, phosphite, phosphonate, pyrophosphate, hypochlorite, chlorite, chlorate, perchlorate, iodate, periodate, bromate, borate, carbonate, nitrate, nitrate, aluminate, and manganate. Organic anions may be selected from carboxylates, such as citrate, lactate, acetate, benzoate, formate, malate, malonate, fumarate, oxalate, propionate, butyrate, tartrate, and valerate, phthalate, among others.

Preferably, the salt is selected from the group consisting of potassium bromide (KBr), sodium chloride (NaCl), potassium chloride (KCl), trisodium phosphate ($Na_3PO_4$), sodium carbonate ($NaCO_3$), sodium sulfate ($Na_2SO_4$), potassium sulfate ($K_2SO_4$), magnesium sulfate ($MgSO_4$), magnesium chloride ($MgCl_2$), calcium chloride ($CaCl_2$), calcium carbonate ($CaCO_3$), disodium hydrogen phosphate ($Na_2HPO_4$), sodium dihydrogen phosphate ($NaH_2PO_4$), sodium hydrogen carbonate ($NaHCO_3$), potassium hydrogen sulfate ($KHSO_4$), sodium hydrogen sulfate ($NaHSO_4$), sodium sulfite ($Na_2SO_3$), and sodium hydrogen sulfite ($NaHSO_3$). These may be used singly or in a combination of two or more. Among those salts, KBr and NaCl are most preferred.

As mentioned above, the specific (over)critical concentration of the liquid polymer solution (P) varies by the kind of salt used. For instance, when KBr is used as the salt, the salt concentration of the overcritical salt rich liquid polymer solution (P) is preferably in the range of at least 1.8 mol/L, more preferably from 2.0 mol/L to 3.0 mol/L. In case of NaCl, for instance, the salt concentration of the overcritical salt rich liquid polymer solution (P) is preferably at least 3 mol/L.

Furthermore, the overcritical salt rich liquid polymer solution (P) has a viscosity, measured as dynamic viscosity at room temperature (20° C.) using a rheometer, of 10 to 100000 mPa·s before exposing it to the aqueous medium in step (ii) of the method according to the present invention, which acts as a non-solvent. Details on the measurement method for determining the viscosity are described in the Examples below. Preferred viscosities of the overcritical salt rich liquid polymer solution (P) are 100 mPa·s or higher, more preferably 500 mPa·s or higher, and most preferably 1000 mPa·s or higher. Further, the viscosity of the overcritical salt rich liquid polymer solution (P) is preferably 70000 mPa·s or less, more preferably 50000 mPa·s or less, and most preferably 20000 mPa·s or less.

According to the present invention, this overcritical salt rich liquid polymer solution (P) having a specific viscosity and a homogeneous single phase is exposed in step (ii) to an aqueous medium so as to decrease the salt concentration, which triggers the complexation of the polyelectrolyte and precipitation of the polyelectrolyte complex (PEC), which forms the PEC membrane. That is, the PEC membrane according to the present invention is prepared from the overcritical salt rich liquid polymer solution (P) having a specific viscosity and a homogeneous single phase via a salt dilution induced phase separation. Notably, according to the present invention, this step is carried out without preparing the solid polyelectrolyte complex (PEC) or a coacervate phase beforehand, as it is described e.g. in U.S. Pat. No. 10,253,203 B2 and WO 2018/208902 A1.

This phase transition process is comparable to the established fabrication process of polymer membranes applying non-solvent induced phase separation (NIPS) via immersion precipitation, where a solid membrane is formed from a liquid polymer solution. So, the phase transition process can be similarly represented in an exemplary three component phase diagram with polyanion/polycation, salt as a solvent and $H_2O$ as non-solvent as shown in FIG. 12. During step (ii) of the method of the present invention, in which the overcritical liquid polymer solution (P) is exposed to an aqueous medium (not including an organic solvent), the salt concentration is reduced until the composition crosses the binodal curve where the demixing process starts. The overcritical liquid polymer solution (P) demixes into the two phases, the polymer rich and the salt rich phase. This state lying on the tie line represents the coacervate in FIG. 1.

Further salt dilution leads to polyelectrolyte complexation and a solid polyelectrolyte complex (PEC) membrane with polymer matrix and membrane pores is formed.

The start of membrane formation with the overcritical liquid polymer solution (P) enables the manipulation of the composition path, the composition of the point where demixing starts, and thus the final membrane properties. As will be discussed below, polyelectrolyte complex membranes can be fabricated with different polyion ratios. Different membrane structures and properties emerge and show that the polyion ratio has a major impact on the phase transition process.

How this step (ii) of exposing the overcritical salt rich liquid polymer solution (P) to the aqueous medium is carried out, so as to decrease the salt concentration, is not particularly limited. For instance, liquid polymer solution (P) obtained in step (i) may be simply immersed in a coagulation bath including the aqueous medium, which may also be referred to as coagulation medium. This coagulation medium (aqueous medium) is not restricted to pure water, but may contain salts or other additives (excluding organic solvents), as long as said aqueous medium can decrease the salt concentration, which triggers the complexation of the polyelectrolyte and precipitation of the PEC.

The mechanism of the phase transition is similar to the known NIPS processes from organic solvent and non-solvent membrane fabrication. In contrast to NIPS, in the process of the present invention, the high ionic strength solution (P) acts as a solvent, while the aqueous medium is the non-solvent. So, water acts as a solvent and non-solvent. The right processing and tailoring of the polymer liquid solution (P) enables the fabrication of complete PEC membranes.

Furthermore, said exposing step (ii) may be carried out at any suitable temperature. For instance, step (ii) of the method of the present invention may be carried out at a temperature of from 2° C. to 90° C., preferably at a temperature of from 15° C. to 70° C., more preferably at a temperature of from 25° C. to 60° C. As will be described below, also the temperature affects the properties of the resulting PEC membrane.

According to a preferred embodiment, said step (ii) comprises applying the overcritical salt rich liquid polymer solution (P) onto a substrate by casting, printing, coating or spinning, and thereafter, immersing the same in the aqueous medium which acts as non-solvent, thereby forming a freestanding flat-sheet polyelectrolyte complex (PEC) membrane in case of using a flat substrate, or forming a tubular polyelectrolyte complex (PEC) membrane or a freestanding hollow fiber polyelectrolyte complex (PEC) membrane in case of using a tubular substrate.

An exemplary embodiment of producing flat-sheet PEC membranes according to the present invention is shown in FIG. 3. As illustrated in FIG. 3, the overcritical salt rich liquid polymer solution (P) is cast onto a flat substrate. Upon immersion in water as non-solvent, due to the decreased salt concentration (i.e. salt dilution), the polyelectrolyte complex (PEC) precipitates, thus forming the PEC membrane. The substrate is not particularly limited and can be selected from the group consisting of a glass surface, a plastic surface such as a polytetrafluoroethylene (PTFE) surface or a polypropylene surface, a ceramic surface, a metal surface, a porous surface such as a non-woven surface, and surfaces that are preformed membranes of membrane materials known in the art such as PES, PSU, polyvinylidene difluoride (PVDF), poly(vinyl chloride) (PVC), polyether ether ketone (PEEK), cellulose, and ceramics.

Preferably, in step (ii) of the method of the present invention, the overcritical salt rich liquid polymer solution (P) is applied onto a tubular non-woven substrate thereby forming a tubular composite polyelectrolyte complex (PEC) membrane. An exemplary embodiment of producing such a tubular composite PEC membrane according to the present invention is shown in FIG. 11. Casting, coating or printing the overcritical salt rich liquid polymer solution (P) on a tubular non-woven substrate is especially suited for producing a tubular composite PEC membrane which can be used for high pressure applications.

In this context, it should be noted that according to the present invention, it is possible to apply two or more overcritical salt rich liquid polymer solutions (P) onto the substrate, which differ from one another in at least one of the salt concentration, the concentration of the polyanions (A) and polycations (C), and the molar monomer ratio of the polyanions (A) to the polycations (C). As will be described later in more detail, by said differences, it is possible to tune the PEC membrane properties.

Alternatively, according to another preferred embodiment, step (ii) comprises forming a hollow fiber by extruding the overcritical salt rich liquid polymer solution (P) with a bore solution through a spinneret as shown in FIG. 8. Preferably, step (ii) further comprises immersing the extruded hollow fiber into a coagulation bath comprising the aqueous medium, thereby forming a freestanding hollow fiber PEC membrane.

FIG. 8 shows a single orifice spinneret. However, according to the present invention, spinnerets with multiple orifices can be used that allow extruding multiple polymer solutions with bore and shell solutions.

As mentioned above, the PEC membrane properties can be tuned by several process conditions, which can be adjusted in steps (i) and (ii) of the method according to the present invention. In particular, the following parameters in terms of charge, pore radius and density of the PEC membrane can be adjusted.

1. Polymer Concentration in the Overcritical Salt Rich Liquid Polymer Solution (P)

The polymer concentration has a major impact on the final PEC structure. A low polymer concentration leads to a less dense and more porous polymer network. The resulting membrane has micro- or ultrafiltration properties. Polymer solutions with high polymer concentration are used to fabricate dense ultrafiltration or nanofiltration membranes as well as reverse osmosis membranes, the latter of which having a virtually dense (nanofiltration membranes) or dense (reverse osmosis membranes) skin layer.

Preferably, the total concentration of the polyanions (A) and polycations (C) in the overcritical salt rich liquid polymer solution (P) is in the range of 1 to 80 wt.-%, more preferably from 5 to 70 wt.-%. However, the concentration of the polyanions (A) and polycations (C) depends on the type of polyelectrolytes used. Thus, in case of using PSS and PDADMAC as polyanions (A) and polycations (C) along with KBr as the salt, the concentration of the polyanions (A) and polycations (C) in the liquid polymer solution (P) may be from about 10 wt.-% to about 50 wt.-%, preferably from about 12 wt.-% to about 40 wt.-%.

2. Monomer Ratio of Polyanions (A) and Polycations (C)

The monomer ratio of the polyanions (A) and polycations (C) (polyanion/polycation) has a major influence on the complexation behavior Polyelectrolyte structures with high density are achieved by a high degree of ionic crosslinks between polyanions and polycations. Therefore, an idealistic equal or realistic natural ratio of oppositely charged ionic groups is required. By the adjustment of the density of polyelectrolyte complex structure, membrane properties can be tuned in the range of microfiltration to reverse osmosis membranes.

According to a preferred embodiment, the molar monomer ratio of the polyanions (A) to the polycations (C) in the overcritical salt rich liquid polymer solution (P) is thus 10:90 to 90:10, more preferably 40:60 to 60:40. Most preferably, the polyanions (A) are used at least in an equimolar and preferably in an excess amount compared to the polycations (C), i.e. the ratio is at least 50:50, preferably 55:45 or higher. By the excess of polyanions (A) (e.g. in a ratio of 55:45), a thicker dense top layer as well as a sponge like porous sub layer with larger pore size can be formed, compared to the equimolar ratio.

As will be described in the Examples, according to the present invention, it has been found that different phase inversion paths can occur for different polyanion/polycation ratios, resulting in morphological differences. Membranes with porous symmetric structures, such as in Example 1 form through instantaneous homogeneous precipitation of the whole film. The demixing is the diffusion of salt into the water as a non-solvent, while the water diffuses into the polymer solution. The delay time is defined as the time the composition first reaches the binodal. In this case, the complete film will be demixed, prior the binodal can be reached and precipitation starts. The high water content and low salt content throughout the complete film leads to instantaneous homogeneous precipitation of the whole film.

Using the polyanions (A) in an equimolar amount or in an excess, a delayed demixing occurs. The top of the liquid solution in contact with water as the non-solvent precipitates instantaneously forming a dense layer. This layer now acts as a diffusion barrier for the demixing. Therefore, the precipitation of the underlaying zones is delayed forming the sponge like porous sub-structures as shown in Example 2.

3. Dilution Speed

Another factor influencing the PEC properties is the dilution speed in step (ii). Here, the following aspects may be mentioned:
- the concentration gradient due to the osmotic pressure difference between polymer solution and non-solvent (e.g. the addition of additives, which increase the osmotic pressure in the coagulation bath);
- the temperature in the coagulation bath and polymer solution (e.g. increasing/decreasing temperature for higher/lower transport of salt ions); and
- the viscosity of the polymer solution and non-solvent.

During the polyelectrolyte complex formation, salt dilution speed has a major impact on the PEC membrane structure and therefore on its properties. The dilution speed can be adjusted by the concentration gradient between the liquid polymer solution (P) and the non-solvent, the temperature and viscosity of the liquid polymer solution (P) and the non-solvent. As mentioned above, rapid salt dilution is achieved with a high concentration gradient. By the addition of additives e.g. salts to the non-solvent used in step (ii), the concentration difference between the polymer solution and the coagulation bath can be lowered. Thus, it is possible to decrease the dilution speed. High temperature increases the mobility of salt ions resulting in higher dilution speed. A low viscosity in the coagulation bath lowers the ion's mobility and the dilution speed.

Rapid salt dilution forms a thin, (virtually) dense surface layer. By that dense layer, the diffusive transport of salt out of the polymer phase is decreased. As a result, a porous structure is formed underneath. The dense surface layer acts as a NF-/RO separation layer, while the porous structure beneath provides mechanical stability.

The charge can be tuned by the monomer ratio of polyanions (A) and polycations (C) as well as by the charge density of the used polyelectrolytes. The thickness of dense and porous layers can be further adjusted by the polymer concentration and the monomer ratio of polyanions (A)/polycations (C).

Ultra- and microfiltration membranes can be produced by the overall decrease in salt dilution speed as described above. This can be achieved by using a lower polymer concentration or by adjusting the monomer ratio of polyanions/polycations, or by adding salt into the coagulation medium, to decrease the phase inversion kinetic.

As described in detail above, with the method of the present invention, flat-sheet as well as hollow fiber and tubular composite PEC membranes can be fabricated through similar fabrication methods that are established. Flat-sheet membranes are e.g. cast on a flat surface; hollow fiber membrane can be produced by wet spinning, for instance; tubular composite membranes can be produced by e.g. coating on non-woven tubular structures. Furthermore, by the new process, a continuous fabrication of e.g. nanofiltration membranes is possible and suits for industrial upscaling.

Thus, the present invention provides PEC membranes, which are preferably—freestanding flat-sheet PEC membranes having a symmetrical or an asymmetrical porosity,
- tubular composite PEC membranes including a non-woven substrate, or
- freestanding hollow fiber PEC membranes having a symmetrical or an asymmetrical porosity.

As mentioned above, by adjusting the process conditions, it is possible to either prepare a PEC membrane having a symmetrical or asymmetrical porosity. Preferably, the PEC membranes according to the present invention have a porous substructure and a non-porous skin layer having smaller pores than the substructure.

In conclusion, the adjustment of the composition polymer solution, the polymer concentration, monomer ratio of polyanions/polycations and the dilution speed enables tuning of the resulting PEC membrane characteristics in the range of microfiltration up to reverse osmosis membranes.

The present invention will be further illustrated in the following examples without being limited thereto.

EXAMPLES

Fabrication of PEC Membranes

In the following, examples for the ultrafiltration (UF)/nanofiltration (NF) properties of produced membranes as flat sheets are given (Examples 1 and 2). For the hollow fiber (Example 3) and tubular composite membranes (Example 4), nanofiltration membranes as an example are presented. All examples are given for the material system polystyrene sulfonate (PSS) (supplied from Sigma Aldrich, average Mw~1,000,000 powder), polydiallyldimethylammonium chloride (PDADMAC) (supplied from Sigma Aldrich, average Mw 400,000-500,000 (high molecular weight), 20 wt. % in $H_2O$), potassium bromide (KBr) (obtained from Alfa Aesar, 99+%) and water ($H_2O$) in the following. PSS and PDADMAC are strong polyelectrolytes (ionization independent of pH). In contrast to the pH shift phase separation process described in US 2018/318775 A1, in the salt dilution induced phase separation process of the present invention, the combination of strong polyanions and polycations can also be used. In addition, PSS and PDADMAC are suitable with regard to industrial upscaling and application. They are resistant against oxidative cleaning, stable in the variety of different pH values, cheap and commercially available.

Further, glycerol from Carl Roth with a purity above 99% was used for the post treatment of polyelectrolyte complex membranes before taking field emission scanning electron microscope images. A polyethersulfone membrane was used as a support membrane in flat-sheet membrane filtration experiments. For membrane cut-off measurements, the polyethylene glycols (PEG) with different molecular weights (200, 400, 1500, 6000, 10000, 35000 g/mol) were purchased by Sigma Aldrich. The four different salts magnesium chloride ($MgCl_2$), sodium chloride (NaCl), magnesium sulfate ($MgSO_4$) and sodium sulfate ($Na_2SO_4$) with ACS reagent grade were supplied by Sigma Aldrich.

Preparation of the Polymer Solution (P)

The preparation of the polymer solution includes the following two steps (cf. FIG. 2):
1. The polyanion PSS is dissolved in an aqueous KBr solution with a concentration of 2 mol KBr/L.
2. The polycation PDADMAC is added and dissolved.

The viscosity of the polymer solution is measured with rheometer Anton Paar MCR 102. The viscosity is measured as the dynamic viscosity with the Newton equation.

$$\eta = \tau/y \qquad \text{Newton equation}$$

Rotation with controlled shear rate. Defined shear rates y [$s^{-1}$] are applied on the fluid and the resulting shear stress $\tau$ [Pa] is measured. Shear stress and shear rate lead to the viscosity $\eta$ [Pa·s].

Characterization of Membranes

The properties of the PEC membranes are characterized by field emission scanning electron microscope (FESEM) images and filtration experiments. The membrane morphology is analyzed with FESEM images. Pure water permeance (PWP), salt retentions and molecular weight cut-off measurements are used to determine nanofiltration properties. The pure water permeance is measured at 3 bar transmembrane pressure (TMP). The molecular weight cut-off (MWCO) is determined with cross-flow filtration experiments at 3 bar TMP with aqueous solutions that contain polyethylene glycols (PEG) with different molecular weights. The final concentration of each PEG in feed and permeate samples is determined with size-exclusion chromatography using an Agilent 1200 system, and the retention is calculated with equation 1.

$$R = \left(1 - \frac{c_{permeate}}{c_{feed}}\right) \cdot 100\% \qquad \text{Equation 1}$$

In a sieve curve, all retentions and molecular weight are plotted, and the molecular weight that is retained by 90% by the membrane is determined as the molecular weight cut-off. Salt retentions are determined with cross-flow filtration experiments, at 3 bar TMP. Separate salt filtration experiments are conducted with aqueous solutions that have a salt concentration of 5 mmol. The final salt concentrations in feed and permeate samples are characterized with a conductivity meter (SevenCompact pH/Cond 5213, Mettler Toledo) and the retention is calculated with equation 1.

Example 1—Flat-Sheet Ultrafiltration Membrane

A liquid polymer solution is cast with a casting knife on an aluminum plate with 150 µm film thickness, as shown in FIG. 3. The polymer solution has a temperature of 22° C. and a viscosity of 12000 mPa·s. It is immersed into the coagulation bath of deionized water. The coagulation bath temperature is 22° C. The polyelectrolytes precipitate and form a freestanding polymeric complex flat-sheet membrane. The precipitation process takes less than 2 seconds. In the polymer solution for the ultrafiltration membrane, the molar monomer ratio of PSS:PDADMAC is 45:55. It has the following composition: 13 wt.-% PSS, 12 wt.-% PDADMAC, 15 wt.-% KBr, 60 wt.-% $H_2O$. The excess of polycation results in less polyelectrolyte complexation, and thus a less dense porous structure. This is desired to get ultrafiltration properties.

Figure 4A:
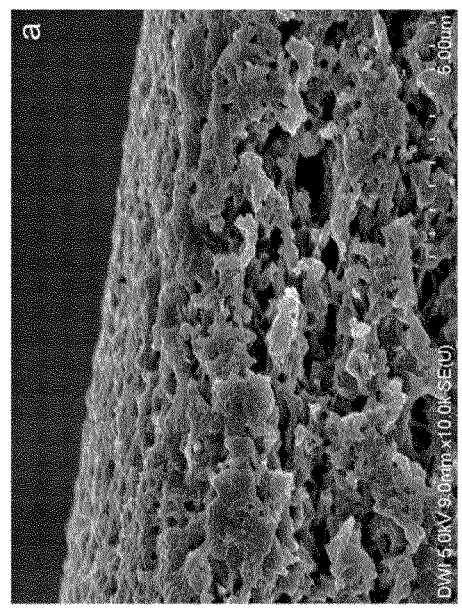

Field emission scanning electron microscopy (FESEM) images are represented in FIG. 4. The cross-section images show that the flat-sheet membrane has an isometric porous structure. There is no dense separation layer on the top- and down-surfaces as can be seen in FIGS. 4a and 4b. A flat-sheet membrane sample is built into a filtration cell and is characterized under the above-mentioned conditions. The pure water permeance (PWP) of the PEC flat-sheet membrane that was fabricated with a 45:55 monomer ratio of PSS and PDADMAC was 6 L/$m^2$·h. The molecular weight cut-off (MWCO) of the obtained PEC flat-sheet membrane was 30000 Da. This is a typical MWCO for an ultrafiltration membrane which is supported by the observed FESEM images.

Example 2—Flat-Sheet Nanofiltration Membrane

Example 2 is carried out similarly to Example 1 except for using a different composition of the polymer solution. In particular, the polymer solution for fabrication of the nanofiltration membrane has an equimolar monomer ratio of PSS:PDADMAC (50:50). Its composition is: 14 wt.-% PSS, 11 wt.-% PDADMAC, 15 wt.-% KBr, 60 wt.-% $H_2O$. The temperature of the polymer solution is 22° C. and the viscosity 12000 mPa·s. The film casting thickness is 150 µm. The coagulation bath contains deionized water at a temperature of 22° C. The complexation takes less than 2 seconds. The equal monomer ratio of charged functional groups results in a dense surface layer, as seen in FIG. 5c. By the hindered transport of salt, the speed of dilution beneath the dense layer is decreased and a porous support structure is formed.

FIG. 5 shows the FESEM images of the membrane that is fabricated with the polymer solution with an equimolar monomer ratio of polycation/polyanion. In contrast to the images in FIG. 4, this flat-sheet membrane has a dense surface layer on the down surface side (cf. FIG. 5c), while the top surface is porous (cf. FIG. 5a). The dense surface layer acts as the selective NF separation layer, while the porous structure underneath provides mechanical stability.

A flat-sheet membrane sample is built into a filtration cell and is characterized under the above-mentioned conditions. The pure water permeance (PWP) of the PEC flat-sheet membrane that was fabricated with an equimolar monomer ratio of PSS and PDADMAC was 0.5 L/($m^2$·h·bar). The molecular weight cut-off (MWCO) of the obtained PEC flat-sheet membrane was 350 Da. The salt retention hierarchy of the PEC flat-sheet membrane is shown in FIG. 6. The high retention above 90% for $MgCl_2$ as shown in FIG. 6 and the molecular weight cut-off of 350 Da show that this membrane has nanofiltration membrane properties.

The fabrication of flat-sheet membranes with two different polymer solution compositions shows that by simply adjusting the molar monomer ratio of polycation and polyanion, membrane properties can be tuned. The membrane that was fabricated with an equimolar monomer ratio of polycation/polyanion has nanofiltration properties, while the membrane with a molar monomer ratio of 45:55 PSS:PDADMAC shows ultrafiltration properties. Thus, the membrane can be tuned by adjusting the ratio polycation/polyanion.

Example 3—Hollow Fiber Nanofiltration Membrane

The hollow fiber membrane is fabricated with the same liquid polymer solution as used in Example 2. The fabrication of PEC hollow fiber membranes is shown in FIG. 8, in which the liquid polymer solution is extruded with water (as bore liquid) in a single orifice spinneret. Through the contact with water, precipitation of polyelectrolytes is induced and a freestanding polymeric complex hollow fiber membrane is formed. The hollow fiber is pulled by a wheel through a water bath and is afterwards collected. FIG. 9 shows a picture of the obtained PEC hollow fiber membrane.

The FESEM images of the hollow fiber membrane are shown in FIG. 10. In contrast to the cross-section images of the nanofiltration flat-sheet membrane of Example 2 (cf. FIG. 5), the fiber has two dense separation layers, on the inner-(cf. FIG. 10c) and outer-side (cf. FIG. 10a). The two dense separation layers are formed through the bore liquid. So, by adjusting the coagulation bath and the bore liquid composition, the properties of the dense separation layer on the inner and outer surface of the hollow fiber can be tuned.

A fiber sample is built into a tubular filtration cell and is further characterized. The same filtration experiments, such as for the flat-sheet membrane characterization, are conducted. The resulting pure water permeance and MWCO are as follows: PWP: 1 L/m²·h·bar, MWCO: 600 Da. The salt retentions of the PEC hollow fiber membrane are shown in FIG. 7. The high retention of $MgCl_2$ and the molecular weight cut-off of 600 Da show that the hollow fiber has nanofiltration properties.

Example 4—Tubular Composite Nanofiltration Membrane

A tubular non-woven tape is cast by hand with the same liquid polymer solution used in Example 2. The one tape tubular non-woven support is made by winding on a mandrel two porous non-woven tapes as shown in FIG. 11. The tapes are connected together by ultrasonic welding. After the welding step, the liquid polymer solution of Example 2 is coated continuously on the inside of the tubular non-woven support. Then, it is immersed into a coagulation bath, so the polyelectrolytes precipitate and form a PEC membrane separation layer. The resulting pure water permeance (PWP) and salt retention are as follows: PWP 1 L/m²·h·bar, $MgCl_2$ retention 80%. The high $MgCl_2$ retention shows that the PEC tubular composite membrane has nanofiltration properties.

The invention claimed is:

1. A method for producing a polyelectrolyte complex (PEC) membrane having a predetermined porosity via salt dilution induced phase separation, the method comprising the following steps:
    (i) providing a liquid polymer solution having a homogeneous single phase at an overcritical salt concentration, where the overcritical salt concentration is a salt concentration higher than the salt concentration at the critical point, by mixing polyanions and polycations in an aqueous medium, the liquid polymer solution containing the polyanions and polycations dissolved in the aqueous medium in a state where the polyanions and polycations do not form a polyelectrolyte complex (PEC), wherein the complexation of the polyelectrolyte is suppressed by the overcritical salt concentration of the liquid polymer solution, which is adjusted either by the addition of a salt before the mixing step and/or by the addition of the salt after the mixing step; and
    (ii) thereafter, without preparing the solid polyelectrolyte complex (PEC) or a coacervate phase, exposing the overcritical salt rich liquid polymer solution having a homogeneous single phase to an aqueous medium so as to decrease the salt concentration, which triggers the complexation of the polyelectrolyte and precipitation of the polyelectrolyte complex (PEC), thereby forming the polyelectrolyte complex (PEC) membrane,
    wherein the overcritical salt rich liquid polymer solution has a viscosity, measured as dynamic viscosity at room temperature using a rheometer, of 10 to 100000 mPa·s before exposing it to the aqueous medium in step (ii),
    wherein the salt concentration of the overcritical salt rich liquid polymer solution in step (i) is sufficiently high so that the formation of the solid polyelectrolyte complex (PEC) and of the coacervate phase can be suppressed, and
    wherein the method does not employ any organic solvent.

2. The method according to claim 1, wherein the polyanions are polymers having at least one anionic functional group selected from the group consisting of sulfonates, carboxylates, and phosphates.

3. The method according to claim 1, wherein the polycations are polymers having at least one cationic functional group selected from the group consisting of primary amines, secondary amines, tertiary amines, quaternary amines, amides, and pyridinium moieties.

4. The method according to claim 1, wherein the salt is selected from the group consisting of potassium bromide (KBr), sodium chloride (NaCl), potassium chloride (KCl), trisodium phosphate ($Na_3PO_4$), sodium carbonate ($NaCO_3$), sodium sulfate ($Na_2SO_4$), potassium sulfate ($K_2SO_4$), magnesium sulfate ($MgSO_4$), magnesium chloride ($MgCl_2$), calcium chloride ($CaCl_2$)), calcium carbonate ($CaCO_3$), disodium hydrogen phosphate ($Na_2HPO_4$), sodium dihydrogen phosphate ($NaH_2PO_4$), sodium hydrogen carbonate ($NaHCO_3$), potassium hydrogen sulfate ($KHSO_4$), sodium hydrogen sulfate ($NaHSO_4$), sodium sulfite ($Na_2SO_3$), and sodium hydrogen sulfite ($NaHSO_3$).

5. The method according to claim 1, wherein the salt concentration of the overcritical salt rich liquid polymer solution in step (i) is in the range of 0.01 mol/L to 7.0 mol/L.

6. The method according to claim 1, wherein the polyanions and polycations are strong polyelectrolytes, the functional groups of which are selected from the group consisting of sulfonates and quaternary amines, respectively.

7. The method according to claim 1, wherein the polyanions include poly(styrene sulfonate) and the polycations include poly(diallyldimethylammonium chloride).

8. The method according to claim 1, wherein the total concentration of the polyanions and polycations in the overcritical salt rich liquid polymer solution is in the range of 1 to 80 wt.-%.

9. The method according to claim 1, wherein the molar monomer ratio of the polyanions to the polycations in the overcritical salt rich liquid polymer solution is 10:90 to 90:10.

10. The method according to claim 1, wherein step (ii) comprises applying the overcritical salt rich liquid polymer solution onto a substrate by casting, printing, coating or spinning, and thereafter, immersing the same in the aqueous medium, thereby forming a freestanding flat-sheet polyelectrolyte complex (PEC) membrane in case of using a flat substrate, or forming a tubular polyelectrolyte complex (PEC) membrane or a freestanding hollow fiber polyelectrolyte complex (PEC) membrane in case of using a tubular substrate.

11. The method according to claim 10, wherein the overcritical salt rich liquid polymer solution is applied onto a tubular non-woven substrate thereby forming a tubular composite polyelectrolyte complex (PEC) membrane.

12. The method according to claim 10, wherein two or more overcritical salt rich liquid polymer solutions are applied onto the substrate, which differ from one another in at least one of the salt concentration, the concentration of the polyanions and polycations, and the molar monomer ratio of the polyanions to the polycations.

13. The method according to claim 1, wherein step (ii) comprises forming a hollow fiber by extruding the overcritical salt rich liquid polymer solution with a bore solution through a spinneret, and optionally immersing the extruded hollow fiber into a coagulation bath comprising the aqueous medium, thereby forming a freestanding hollow fiber polyelectrolyte complex (PEC) membrane.

14. The method according to claim 1, wherein the polyelectrolyte complex (PEC) membrane is a microfiltration membrane, an ultrafiltration membrane, a nanofiltration membrane, a reverse osmosis membrane, a diffusion dialysis membrane, a contactor membrane, an ion-exchange membrane, or a gas separation membrane.

15. The method according to claim 1, wherein the polyelectrolyte complex (PEC) membrane is one of the following:
   a freestanding flat-sheet polyelectrolyte complex (PEC) membrane having a symmetrical or an asymmetrical porosity,
   a tubular composite polyelectrolyte complex (PEC) membrane including a non-woven substrate, or
   a freestanding hollow fiber polyelectrolyte complex (PEC) membrane having a symmetrical or an asymmetrical porosity.

* * * * *